(12) United States Patent
Ackerman et al.

(10) Patent No.: US 6,351,118 B1
(45) Date of Patent: Feb. 26, 2002

(54) MULTIPLEXED DRIVER FOR A MAGNETIC TRANSMITTER

(75) Inventors: John F. Ackerman, Ramsey; Erik H. Lange, Anoka, both of MN (US)

(73) Assignee: Honeywell Inc., Morristown, NJ (US)

( * ) Notice: Subject to any disclaimer, the term of this patent is extended or adjusted under 35 U.S.C. 154(b) by 0 days.

(21) Appl. No.: 09/233,390

(22) Filed: Jan. 19, 1999

(51) Int. Cl.[7] .............................................. G01B 7/004
(52) U.S. Cl. ................... 324/207.17; 702/153
(58) Field of Search ....................... 324/207.12, 207.17, 324/225, 207.11, 207.26; 702/95, 152, 153; 370/214, 431; 455/127; 363/20

(56) References Cited

U.S. PATENT DOCUMENTS 4,870,554 A * 9/1989 Smith .......................... 363/20

5,347,289 A * 9/1994 Elhardt ...................... 342/448

* cited by examiner

Primary Examiner—Hezron Williams
Assistant Examiner—Henry S. Anderson
(74) Attorney, Agent, or Firm—Dennis C. Bremer

(57) ABSTRACT

Helmet trackers include transmitters to transmit information regarding the orientation and position of the helmet, receivers to receive the information, and processors to process the information to determine the position and orientation of the helmet. An apparatus, connected to the transmitter, is used to attain a faster response time for the transmitter to transmit. Such apparatus may include an amplifier, a plurality of capacitors connected to the amplifier, a plurality of transistors each connected to a respective capacitor, and a controller connected to each transistor to control when a transistor turns on. The capacitors can store charge while the transistors are "off," and once the transistors are turned "on", an instant charge will exist to supply energy to the transmitter.

11 Claims, 5 Drawing Sheets

MULTIPLEXED DRIVER FOR A MAGNETIC TRANSMITTER

BACKGROUND OF THE INVENTION

This invention relates to magnetic trackers for tracking the orientation and position of a helmet used by vehicle operators in such vehicles as tanks, planes, etc. Trackers are well known in the present area of technology and the operation of a tracker is described in references U.S. Pat. No. 4,287,809, U.S. Pat. No. 4,945,305, and U.S. Pat. No. 3,868,565.

FIG. 1 shows a block diagram of a tracker. A receiver 12 is mounted on a helmet 13. The receiver 12 is what receives the electromagnetic information of the magnetic field in the operator area. The receiver 12 is typically attached to the operator's helmet 13 so as the helmet 13 moves, the receiver 12 will receive the information required to determine the helmet 13 position and orientation. An example of a receiver 12 would be three inductive coils which is well known in this area of technology. Three coils, one coil each to represent one axis of the triad axes in the helmet coordinate frame, exist to sense the electromagnetic field vectors to be transmitted by a transmitter 11.

Once the components of the magnetic field are obtained, it is necessary to perform calculations on the data. As a result, the data is sent from the receiver 12 to pre-amplifiers 22, 23, 24 via cable 21. The reason for three preamplifiers 22, 23, 24 is to accommodate for the x, y, and z signals of the helmet movements and to amplify the signals for processing. The output of the pre-amplifiers 22, 23, 24 are sent to a multiplexer 25 to combine the three signals. The output of the multiplexer 25 is sent to a central processing unit (CPU) 32. The CPU 32 performs calculations on the data to obtain and accurate mapping of the operator area. Filters, such as bandpass filters, can be used at any point of the system to filter out unwanted signals. Amplifiers, such as a variable gain amplifier, can also be used at any stage of the system to amplify the signals. Furthermore, it is well known that A/D converters are also required for the CPU 32 to process the data. The figure has been simplified only to show the essence of the operation and structure of currently existing trackers.

A selector switch 47 is used to control the transmission of signals to the transmitter 11 by selecting which signal will be sent. The signals are sent through amplifiers 60, 61, and 62 so that the signals have sufficient power for energizing the transmitter 11. The transmitter 11 transmits a magnetic field in the operator area back to the helmet 13. Orientation and position information is sent back to the vehicle systems via an interface so that the vehicle operates accordingly with the information. One such example would be to control the instrumentation of an aircraft.

A driver is used to supply energy to the transmitter 11 to a desired level. As is presently known, inductive coils have been used in a transmitter. A typical drive system uses three or six inductive coils driven sequentially at a fixed repetition rate. During each drive period of each coil, the coil is driven for several periods at the excitation frequency. The large coil excitation levels required are generated by placing a capacitor in series with each transmitter coil so that a high-Q series-resonant network is obtained at the excitation frequency. This resonant network is driven by a sine voltage from a drive amplifier. A high accuracy current sensing resistor provides feedback so that the coil current is driven to the desired level. In previous designs, a separate amplifier and current sensing resistor were used with each coil network. When a sine drive is applied to a network, several excitation cycles elapse before the current stabilizes, as the stored energy increases in the resonant network. It would be desirable to have a driver that does not require several excitation cycles to elapse. Further, it would be desirable to have a non-complex driver with a quicker response.

SUMMARY OF THE INVENTION

A helmet tracker including a transmitter to transmit information regarding the orientation and position of the helmet, a receiver for receiving the information, and a processor for processing the information to determine the position and orientation of the helmet. An apparatus is connected to the transmitter to attain a faster response time for the transmitter to transmit the information.

DETAILED DESCRIPTION OF THE PRESENT INVENTION

Figure 1:
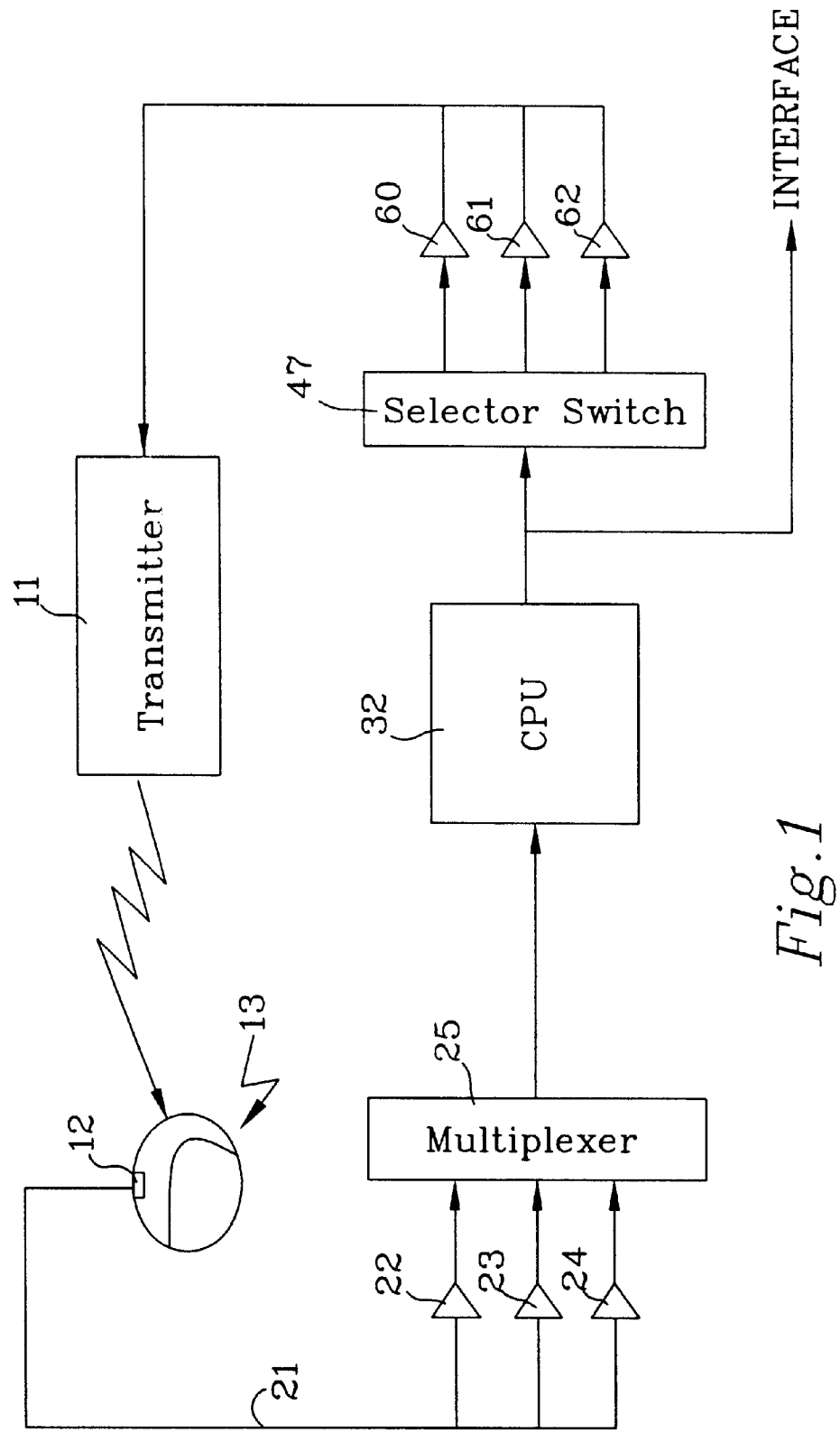
FIG. 1 shows a configuration of a tracker that is presently used.
Figure 2:
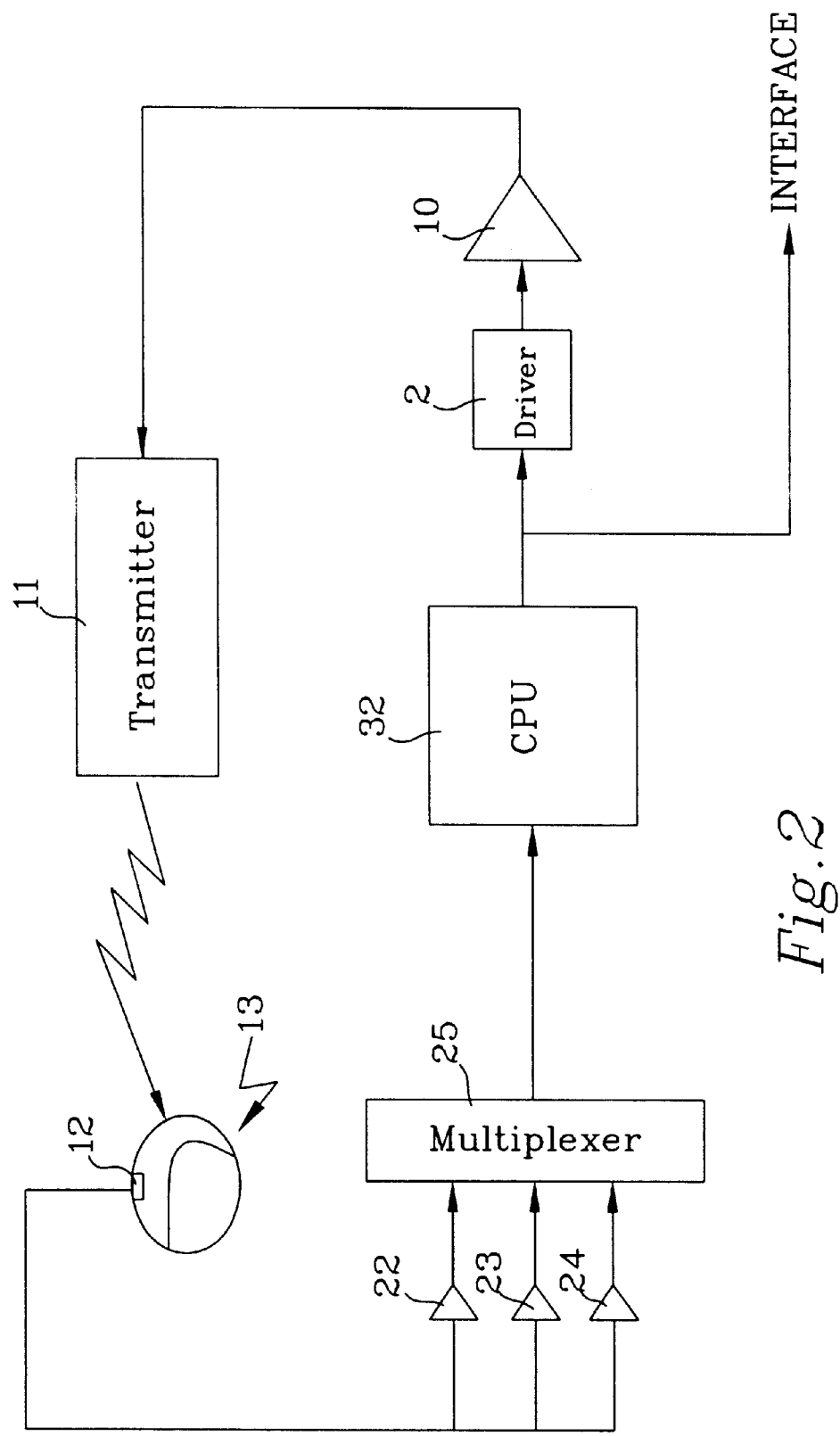
FIG. 2 shows the tracker with the use of the present invention.

FIG. 2 shows the present invention 2 in a tracker. A receiver 12 is mounted on a helmet 13 receiving information of the operator area. The receiver 12 is typically attached to the operator's helmet 13 so as the helmet 13 moves, the receiver 12 will receive the information required to determine the helmet 13 position and orientation. An example of a receiver 12 would be three inductive coils which is well known in this area of technology. Three coils, one coil each to represent one axis of the triad axes in the helmet coordinate frame, exist to sense vectors to be transmitted by a transmitter 11. The data is sent from the receiver 12 to pre-amplifiers 22, 23, 24. The reason for three preamplifiers 22, 23, 24 is to accommodate for the x, y, and z signals of the helmet movements and to amplify the signals for processing. The output of the pre-amplifiers 22, 23, 24 are sent to a multiplexer 25 to combine the three signals. The output of the multiplexer 25 is sent to a central processing unit (CPU) 32. The CPU 32 performs calculations on the data to obtain orientation and position information which is sent back to the vehicle systems via an interface so that the vehicle operates accordingly with the information. One such example would be to control the instrumentation of an aircraft. The output from the CPU is also sent to the present invention 2 which controls the transmission of the signals to the transmitter 11. The output out of the present invention 2 is sent to an amplifier 10 and then to the transmitter 11.

Figure 3:
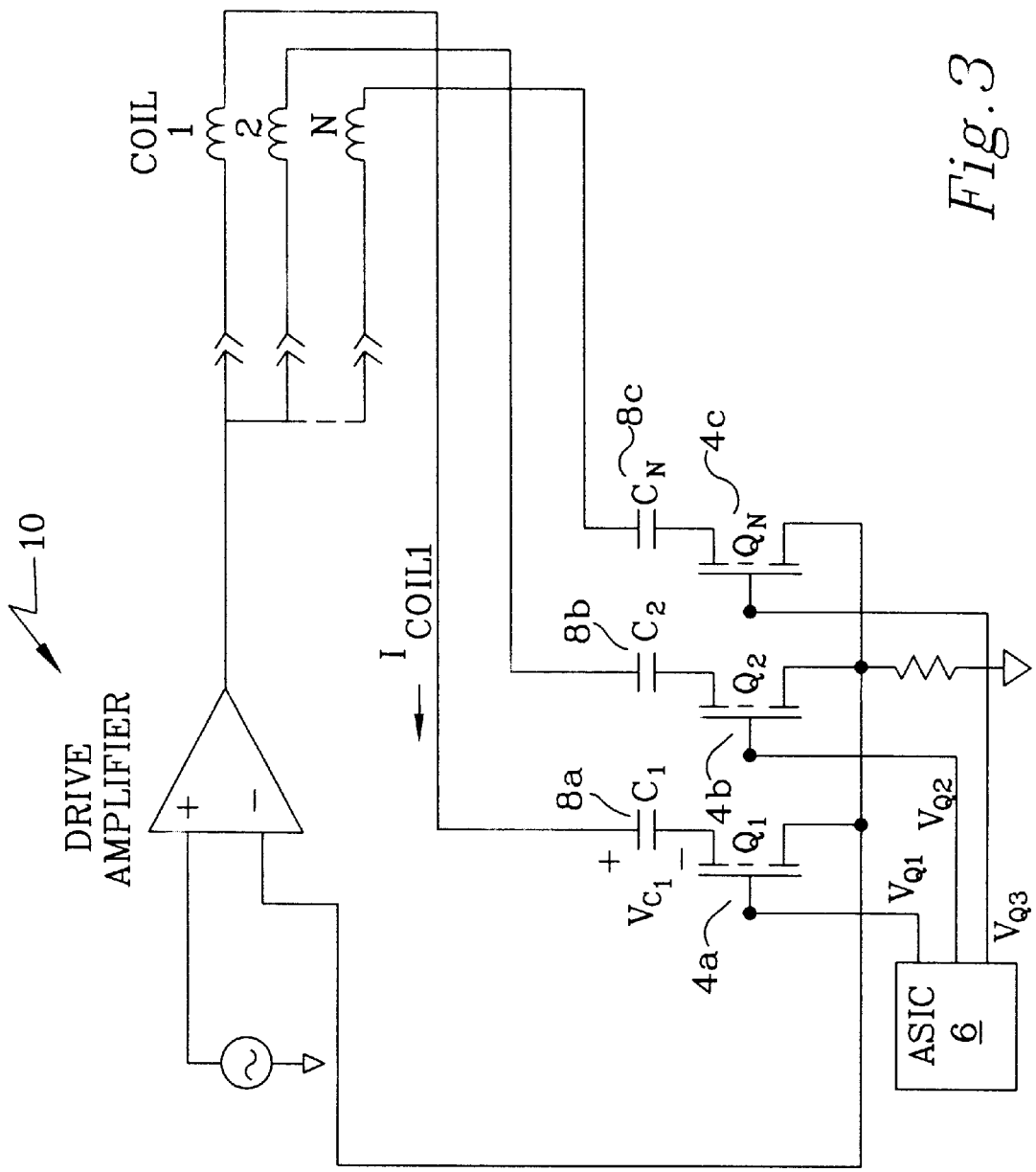
FIG. 3 shows a circuit configuration of a driver of the present invention.

FIG. 3 shows a more detailed configuration of the present invention 2. As seen in FIG. 3, a transistor 4 is added in series with each network. Again, three transistors 4a–4c are used since the present embodiment has three channels working in a triad axes environment. However, any number of transistors can be used depending on the number of channels. For example, a one channel implementation uses just one transistor. The number of transistors equals the number of channels. Depending on which channel is required, the transistor associated with that channel is "turned on" and driven individually while the other transistors are "off". Control signals from a digital Application Specific Integrated Circuit (ASIC) to the transistors 4 are used to control which transistor is "on" at a certain point in time. The key advantage of using transistors 4 in this configuration is that the capacitors 8 can store a charge while the transistors are "off" and once the transistors are turned "on", an instant charge will exist to supply energy to the transmitter 11 of the tracker.

Figure 4:
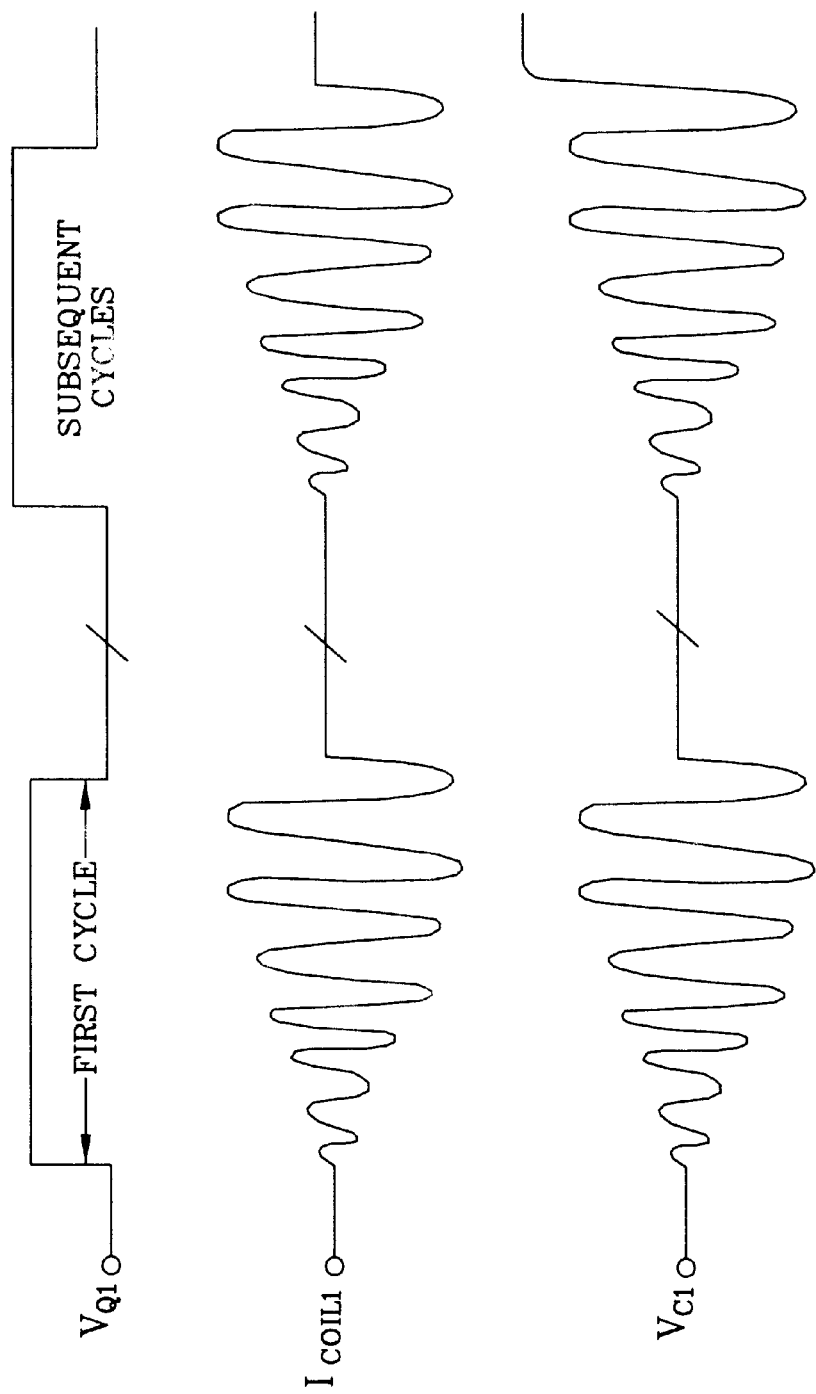
FIG. 4 shows charging and timing diagrams of the operation of past drivers for transmitters.
Figure 5:
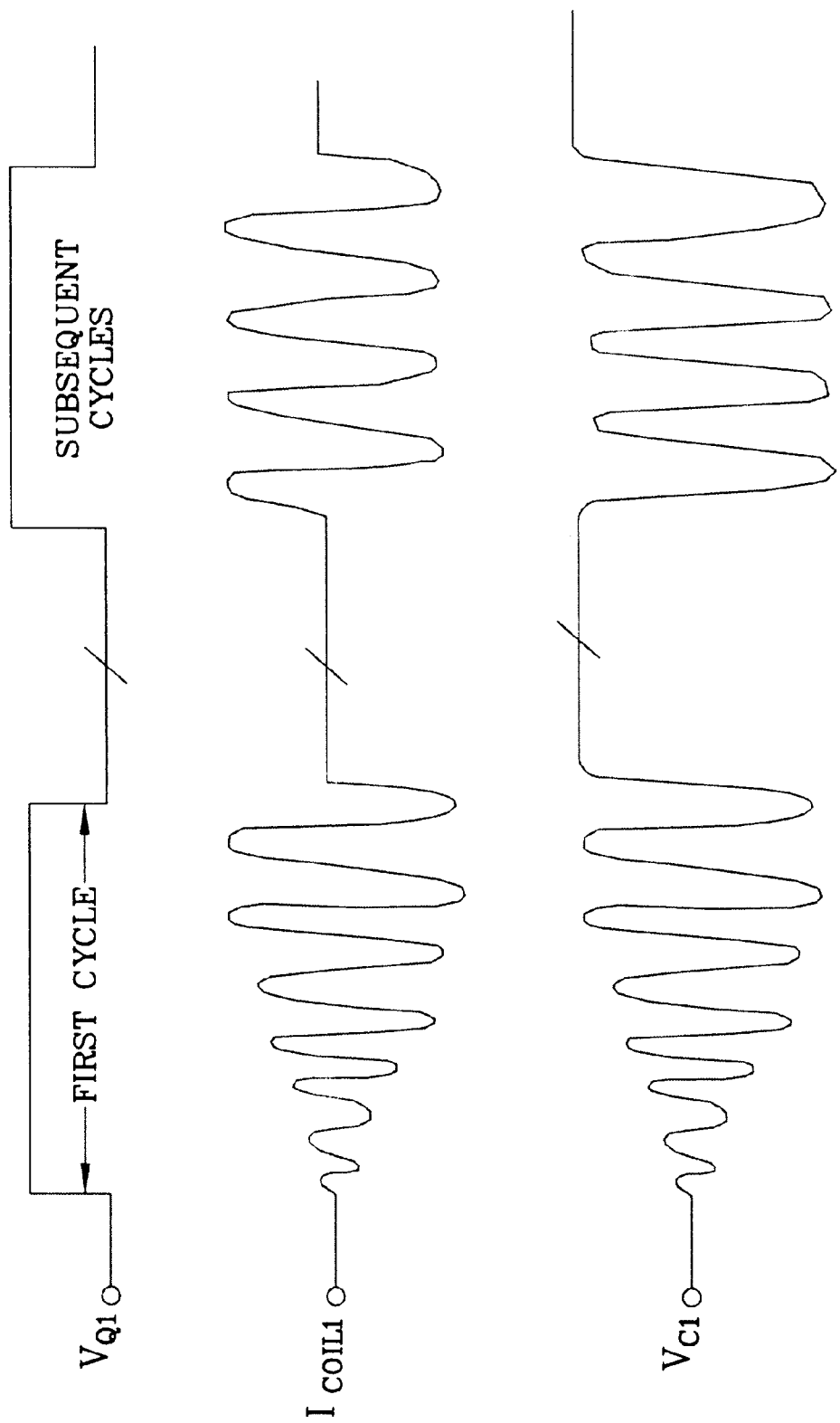
FIG. 5 shows charging and timing diagrams of the operation of the present invention.

FIG. 4 shows the charging and timing diagram of past implementations. As stated in the background of the invention, it takes time for the capacitor to charge up during subsequent cycles in past implementations. As seen in FIG. 4, it is very time consuming for the transmitter 11 to wait for the capacitor 8 to charge up every time it is to be used. FIG. 5 shows the charging and timing diagram of the operation of the present invention. In the first cycle, when the tracker is turned on, as can be seen, it takes time for the charge to build up. With the present invention, the capacitors 8 are already charged up so in subsequent cycles, instead of charging up, the capacitor 8 already has a charge and a faster response time is attained. As a result of the use of the transistors 4, the initial charge on the capacitor 8 exists at the start of all cycles subsequent to the first cycle so that a stable excitation level is obtained more rapidly. Again, this saves a substantial amount of operational time previously wasted in time to charge up for each transmission.

Another advantage of the present invention is the use of a single amplifier 10 common to any number of coil networks. As stated above in the background of the invention, previously, an amplifier was required for each network. This was costly for parts as well as time consuming in production. With the use of transistors 4 and the digital ASIC 6, the amplifier 10 can operate for all the networks and the digital ASIC 6 simply controls the amplifier 10 to amplify the signal of a desired network that is used.

The invention has been described herein in detail in order to comply with the Patent Statutes and to provide those skilled in the art with the information needed to apply the novel principles and to construct and use such specialized materials and components as are required. However, it is to be understood that the invention can be carried out by specifically different materials and components, and that various modifications, both as to the processing details and operating procedures, can be accomplished without departing from the scope of the invention itself.

The embodiments of the invention in which an exclusive property or right is claimed are defined as follows:

1. A helmet tracker, comprising:
   a transmitter to transmit information regarding orientation and position of the helmet;
   apparatus for attaining a faster response time of the transmitter to transmit the information, wherein the apparatus for attaining a faster response time comprises:
   (a) an amplifier;
   (b) a plurality of capacitors connected to the amplifier;
   (c) a plurality of transistors each connected to a respective capacitor; and
   (d) a controller connected to each transistor to control when a transistor turns on;
   apparatus for receiving the information; and
   processing means for processing the information to determine position and orientation of the helmet.

2. The helmet tracker of claim 1, wherein the capacitors store a charge when the respective transistor connected to the capacitor is turned off.

3. The helmet tracker of claim 1, wherein the number of transistors is three.

4. An apparatus for attaining a faster response time of transmitters in helmet trackers, comprising:
   a transmitter;
   an amplifier connected to the transmitter;
   a plurality of means for storing energy; and
   a plurality of means for controlling storage of energy in the storing means and supplying energy to the transmitter for operation wherein each controlling means is connected to a respective storing means.

5. The apparatus of claim 4 wherein the controlling means is a transistor.

6. The apparatus of claim 4 wherein the storing means is a capacitor.

7. The apparatus of claim 4 wherein the number of controlling means is three.

8. The apparatus of claim 4 wherein the number of storing means is three.

9. The apparatus of claim 4, further comprising;
   a controller, connected to the controlling means, to control when the controlling means supplies energy to the transmitter.

10. The apparatus of claim 9 wherein the controller is a digital Application Specific Integrated Circuit (ASIC).

11. An apparatus for attaining a faster response time of transmitters in helmet trackers, comprising:
    a transmitter;
    an amplifier;
    a plurality of capacitors, connected to the transmitter, to store energy; and
    a controller connected to each capacitor to control when energy is supplied to the transmitter.

* * * * *